United States Patent
Coglitore et al.

(10) Patent No.: US 11,269,563 B2
(45) Date of Patent: Mar. 8, 2022

(54) METHOD AND APPARATUS FOR IMPLEMENTING HIGH-SPEED CONNECTIONS FOR LOGICAL DRIVES

(71) Applicant: R-STOR INC., Saratoga, CA (US)

(72) Inventors: Giovanni Coglitore, Saratoga, CA (US); Roger Levinson, Los Gatos, CA (US); Mario J. Paniccia, Santa Clara, CA (US)

(73) Assignee: R-Stor Inc., Saratoga, CA (US)

( * ) Notice: Subject to any disclaimer, the term of this patent is extended or adjusted under 35 U.S.C. 154(b) by 0 days.

(21) Appl. No.: 15/654,128

(22) Filed: Jul. 19, 2017

(65) Prior Publication Data

US 2018/0024782 A1 Jan. 25, 2018

Related U.S. Application Data

(60) Provisional application No. 62/364,068, filed on Jul. 19, 2016.

(51) Int. Cl.
*G06F 3/06* (2006.01)
*G06F 13/40* (2006.01)
*H04J 14/00* (2006.01)

(52) U.S. Cl.
CPC .......... *G06F 3/0688* (2013.01); *G06F 3/0613* (2013.01); *G06F 3/0628* (2013.01); *G06F 3/0638* (2013.01); *G06F 13/4045* (2013.01); *H04J 14/00* (2013.01); *G06F 2213/3852* (2013.01)

(58) Field of Classification Search
CPC .. G06F 3/0688; G06F 3/0628; G06F 13/4045; G06F 3/0613; G06F 3/0638; G06F 3/067; G06F 5/06; G06F 7/00; G06F 5/00; G06F 13/387; G06F 13/38; G06F 2213/3852; H04J 14/00
See application file for complete search history.

(56) References Cited

U.S. PATENT DOCUMENTS

| | | | | |
|---|---|---|---|---|
| 6,889,007 | B1* | 5/2005 | Wang | H04J 14/0226 370/354 |
| 2005/0138191 | A1* | 6/2005 | Seto | H04L 29/06 709/230 |
| 2005/0216659 | A1* | 9/2005 | Ogawa | G06F 12/0866 711/113 |
| 2006/0230428 | A1* | 10/2006 | Craig | A63F 13/12 725/133 |

(Continued)

FOREIGN PATENT DOCUMENTS

EP 2 778 939 A2 9/2014

OTHER PUBLICATIONS

International Preliminary Report on Patentability and Written Opinion issued in corresponding International Application No. PCT/US2017/042806 dated Jan. 31, 2019.

*Primary Examiner* — Idriss N Alrobaye
*Assistant Examiner* — Richard B Franklin
(74) *Attorney, Agent, or Firm* — Rankin, Hill & Clark LLP

(57) ABSTRACT

A method and apparatus may include receiving data from a first device. The data may be received via a first protocol. The method can also include converting the data to be transmitted via a second protocol. The second protocol may be a high-speed proprietary or standard protocol. The method can also include transmitting the data via the second protocol to a second device.

18 Claims, 5 Drawing Sheets

(56) References Cited

U.S. PATENT DOCUMENTS

| | | | |
|---|---|---|---|
| 2007/0011507 A1* | 1/2007 | Rothman | G06F 11/2736 |
| | | | 714/718 |
| 2007/0226757 A1* | 9/2007 | Bashford | G06F 13/385 |
| | | | 719/326 |
| 2008/0183917 A1* | 7/2008 | Cagno | G06F 13/4265 |
| | | | 710/33 |
| 2010/0027559 A1 | 2/2010 | Lin et al. | |
| 2014/0099106 A1* | 4/2014 | Asmanis | H04J 3/047 |
| | | | 398/43 |

* cited by examiner

METHOD AND APPARATUS FOR IMPLEMENTING HIGH-SPEED CONNECTIONS FOR LOGICAL DRIVES

CROSS REFERENCE TO RELATED APPLICATION

This application claims priority to U.S. Provisional Application No. 62/364,068 filed on Jul. 19, 2016. The entire contents of the above-referenced provisional application in hereby incorporated by reference.

BACKGROUND

Field

Certain embodiments of the present invention may relate to implementing high-speed connections for logical drives.

Description of the Related Art

Digital information has been traditionally stored on hard disk drives. Hard disk drives may store digital information using at least one rotating disk that includes magnetic material. The digital information may be written onto and read from the at least one rotating disk by a magnetic head. Because traditional hard disk drives typically use moving/mechanical components, these traditional hard disks would be prone to mechanical failure after extended use. Therefore, solid-state drives have become an increasingly popular replacement for hard disk drives. Solid-state drives are generally considered to be storage devices that store digital information using integrated circuit assemblies, without the use of moving/mechanical components.

SUMMARY

According to a first embodiment, a method can include receiving, by an electronic component, data from a first device. The data is received via a first protocol. The method can also include converting the data to be transmitted via a second protocol. The second protocol is a high-speed proprietary or standard protocol. The method can also include transmitting the data via the second protocol to a second device.

In the method of the first embodiment, the electronic component comprises a gasket module.

In the method of the first embodiment, the first device includes a logical drive that is at least one of a hard drive, a hard-drive platter, and a half-platter, and the second device includes a gasket module.

In the method of the first embodiment, the first device includes a gasket module, and the second device includes a processor of a processor layer.

In the method of the first embodiment, the first protocol includes a SAS or PCIe protocol, and the second protocol includes an optical communication protocol.

In the method of the first embodiment, the first protocol includes an optical communication protocol, and the second protocol includes an electrical protocol.

According to a second embodiment, an apparatus can include at least one processor. The apparatus can also include at least one memory including computer program code. The at least one memory and the computer program code can be configured, with the at least one processor, to cause the apparatus at least to receive data from a first device, wherein the data is received via a first protocol. The apparatus can also be caused to convert the data to be transmitted via a second protocol. The second protocol is a high-speed proprietary or standard protocol. The apparatus can also be caused to transmit the data via the second protocol to a second device.

In the apparatus of the second embodiment, the apparatus includes a gasket module.

In the apparatus of the second embodiment, the first device includes a logical drive that is at least one of a hard drive, a hard-drive platter, and a half-platter, and the second device comprises a gasket module.

In the apparatus of the second embodiment, the first device includes a gasket module, and the second device comprises a processor of a processor layer.

In the apparatus of the second embodiment, the first protocol includes a SAS or PCIe protocol, and the second protocol comprises an optical communication protocol.

In the apparatus of the second embodiment, the first protocol includes an optical communication protocol, and the second protocol comprises an electrical protocol.

According to a third embodiment, a computer program product can be embodied on a non-transitory computer readable medium. The computer program product configured to control a processor to perform a method according to the first embodiment.

BRIEF DESCRIPTION OF THE DRAWINGS

For proper understanding of the invention, reference should be made to the accompanying drawings, wherein.

DETAILED DESCRIPTION

Figure 1:
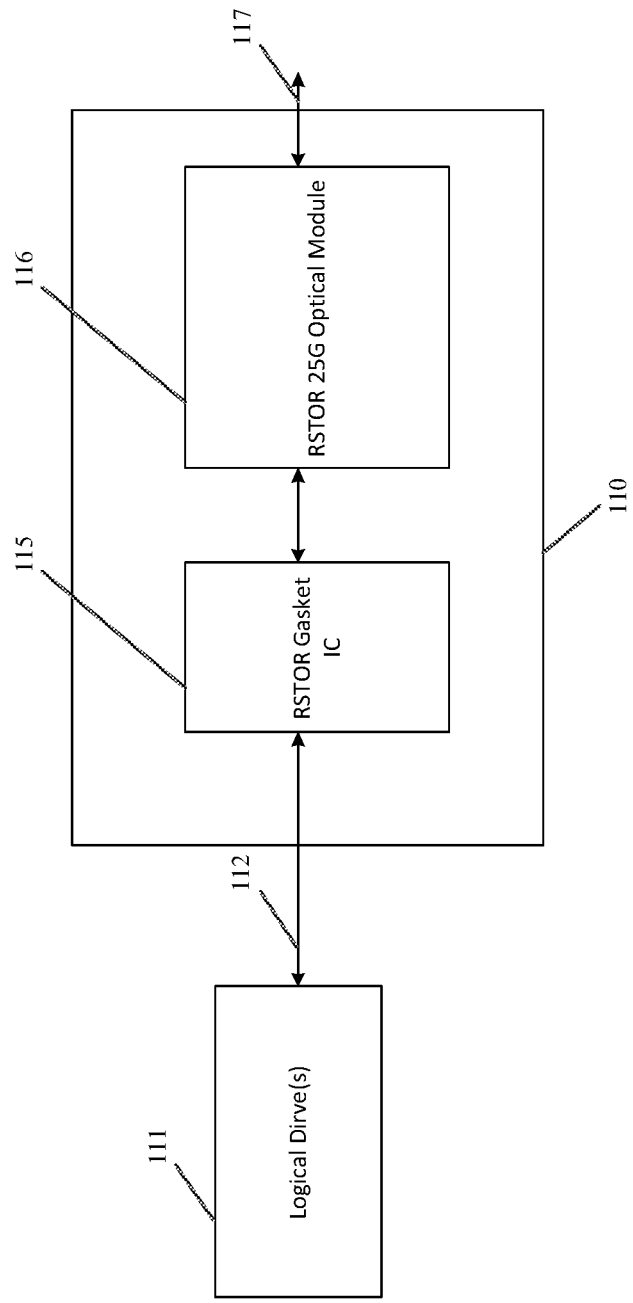
FIG. 1 illustrates a gasket module, in accordance with certain embodiments of the present invention.

Certain embodiments of the present invention may relate to implementing proprietary or standard high-speed data connections for connecting logical drives to, for example, a processor layer. One example proprietary high-speed data connection can be an optical fiber line that uses an optical protocol, for example. A logical drive can correspond to a hard drive, spindle drive, single platter, half-platter, and/or solid state drive, for example. Each logical drive can correspond to an independent storage unit that can be addressable by a distinct/single address. Each logical drive can be addressed by a microcontroller/processor of the processor layer that the logical drive is communicating with, for example.

With certain embodiments, if the proprietary or standard high-speed data connections are optical connections, then the optical connections can be configured between logical drives and the processor layer. With certain embodiments, each lane of data that is transmitted from each logical drive can be configured with its own independent line of optical fiber, as described in more detail below.

When a logical drive transmits a lane of data, the logical drive typically communicates the data by using Serial Attached SCSI (SAS) interfaces or PCI Express (PCIe)

interfaces/protocol. As described in more detail below, certain embodiments can convert data that is first transmitted via SAS or PCIe protocols into data that is transmittable by the proprietary or standard high-speed data protocol.

Certain embodiments can implement a one-to-one correspondence between each SAS connection/PCIe connection and each associated corresponding high-speed data line. As described above, the high-speed data line can be an optical fiber line, for example. Therefore, with certain embodiments, each SAS/PCIe data line can have a corresponding optical fiber line.

Other embodiments of the present invention may implement a many-to-one correspondence between SAS/PCIe data lines and an optical fiber line. Specifically, certain embodiments may utilize optical multiplexing to send multiple data lanes over a single fiber. The multiplexer may decide which data lane (among a plurality of data lanes) is to be transmitted over the single optical fiber line at any given time, for example.

As described above, the output that is transmitted from each logical drive can be transmitted via a SAS or PCIe protocol, for example. Typically, with the previous approaches, the output from each logical drive is transmitted to a switching layer or an expander layer, and then the data is transmitted from the switching/expander layer to at least one processor of a processor layer. With these previous approaches, the wires/lines between the switching layer and the processor layer are typically implemented using long copper traces.

Certain embodiments of the present invention seek to eliminate the switching/expanding layer by directly connecting each logical drive to its corresponding processor. However, connecting logical drives to corresponding processors can present a physical problem because the distances between the logical drives and the processors can be very lengthy. For example, even if a logical drive and its corresponding processor are located within a same rack, the distance between the logical drive and its corresponding processor may still be around 3 meters.

FIG. 1 illustrates a gasket module 110, in accordance with certain embodiments of the present invention. Certain embodiments are directed to an electronic device/component that may be referred to as gasket module 110. Gasket modules may receive data in a first form and convert the received data into a second form for further transmission. For example, a first gasket module of certain embodiments may receive data from a logical drive 111 via a connection 112, via the SAS or PCIe protocol. With certain embodiments, connection 112 may comprise 2 ports of SAS 12 g or 2 lanes of PCI gen 3, for example. In one example embodiment, an integrated circuit 115 of the gasket module 110 may receive the data from logical drive 111. A second electronic device, optical module 116, can then convert the received data into a proprietary high-speed data protocol. The high-speed data protocol can be an optical protocol, for example. The high-speed data can then be transmitted from gasket module 110 via connection 117.

Figure 2:
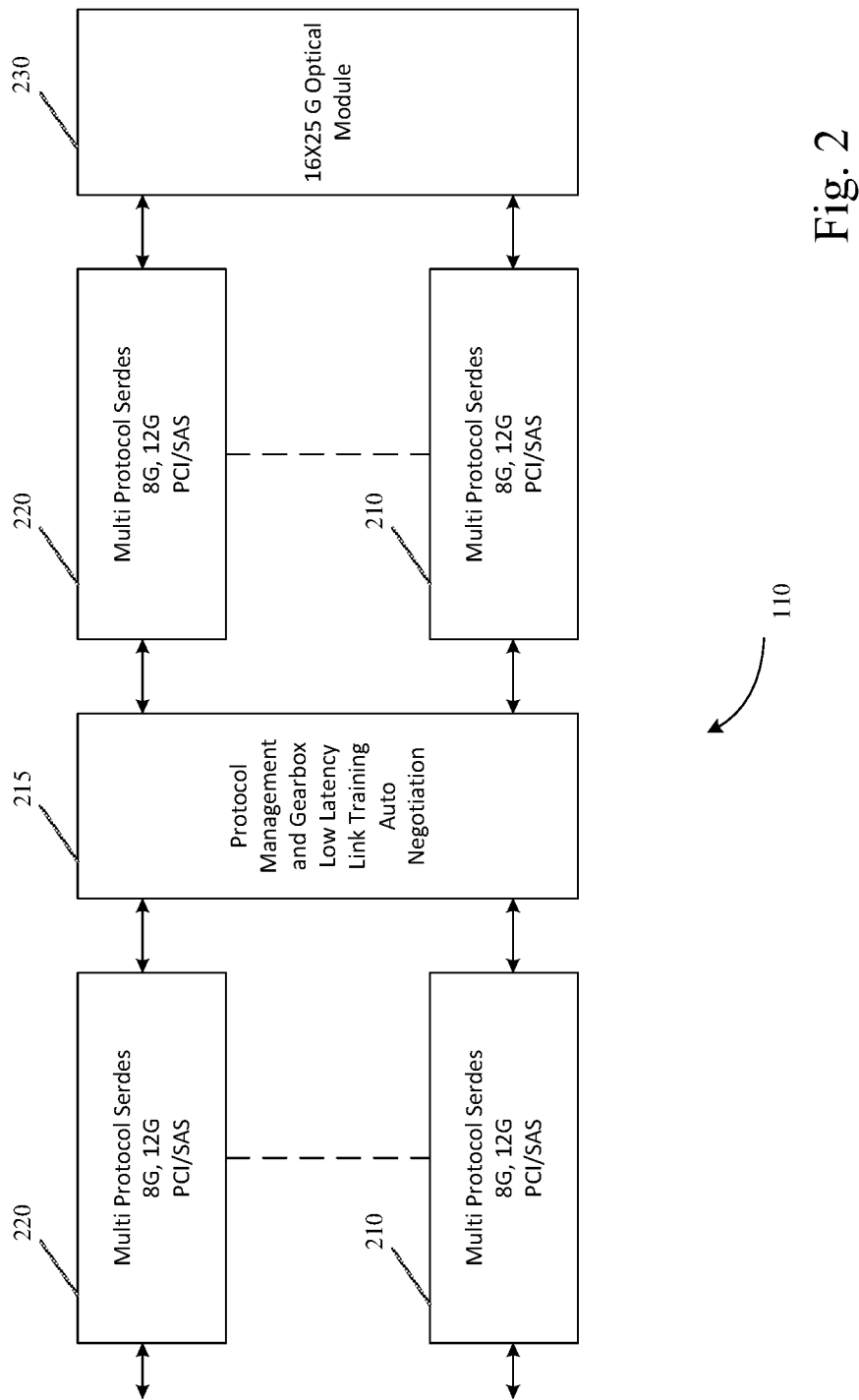
FIG. 2 illustrates a block diagram of the gasket module, in accordance with certain embodiments of the present invention.

FIG. 2 illustrates a block diagram of gasket module 110, in accordance with certain embodiments of the present invention. Electronic components Multi Protocol Serdes (210 and 220) may receive data transmitted from logical drive 111. Gasket module 110 may also include a protocol management and gearbox device 215 for performing low latency link training and automatic negotiation. Gasket module 110 may also include an optical module 230 that converts data to be transmittable via the proprietary or standard high-speed data protocol.

With certain embodiments, gasket module 110 can transmit the converted data to a second gasket chip. After receiving the proprietary high-speed data from gasket module 110, the second gasket chip may further convert the proprietary or standard high-speed data into electrical signals that can be received by the processor layer.

Further, certain embodiments of the present invention may also perform data-rate multiplication. For example, an electronic controller (such as gasket module 110, for example) may be configured to receive N lanes of an input of a native data rate protocol. This electronic controller may be gasket module 110, may be a part of gasket module 110, or may be an entirely separate component from gasket module 110. The native data rate may be a rate of M, for example. The native data rate protocol may correspond to a protocol of a SAS interface or a PCI interface, for example. The native data can be received from logical drive 111, for example.

With certain embodiments of the present invention, an electronic controller can also internally multiply the data rate of the native protocol, and the electronic device can combine a plurality of lanes of the native protocol to provide a data rate of N×M data rate.

For example, certain embodiments may input 8 lanes, where each lane has a data rate of 10 Gb/s, and the device/chip may then output 4 lanes at a data rate of 20 Gb/s. Therefore, certain embodiments may thus reduce a number of output lanes and may thus reduce a number of required fibers by an example factor of 2

Certain embodiments may perform wavelength multiplexing. An electronic controller of certain embodiments can be configured to receive an input N Lanes of native data rate, and then certain embodiments may convert the N lanes of input into N different optical wavelengths, lambdas, for example. The different optical wavelengths can be transmitted simultaneously on a single fiber and the different optical wavelengths can then be separated at the other end of the connection into N distinct data lanes. In this case, the number of fibers could be reduced by a factor of N. For example, 10 lanes of 10 Gb/s data could be input to a device, where each of these data streams is transmitted on a different wavelength on a single fiber.

Figure 3:
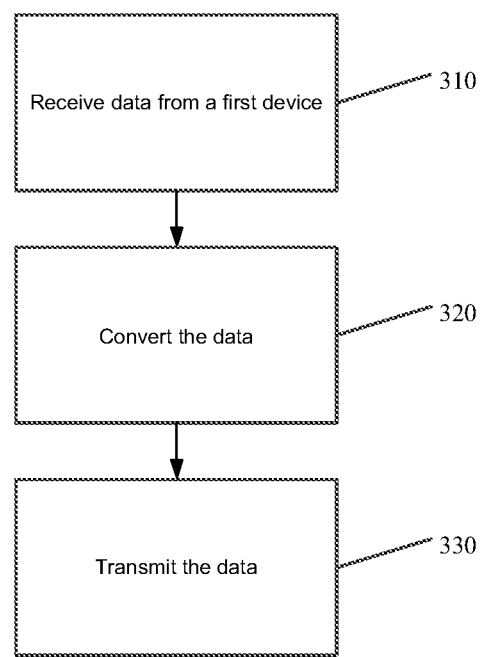
FIG. 3 illustrates a flowchart of a method in accordance with certain embodiments of the invention.

FIG. 3 illustrates a flowchart of a method in accordance with certain embodiments of the invention. The method illustrated in FIG. 3 includes, at 310, receiving, by an electronic component, data from a first device. The data is received via a first protocol. The method can also include, at 320, converting the data to be transmitted via a second protocol, wherein the second protocol is a high-speed proprietary or standard protocol. The method can also include, at 330, transmitting the data via the second protocol to a second device.

Figure 4:
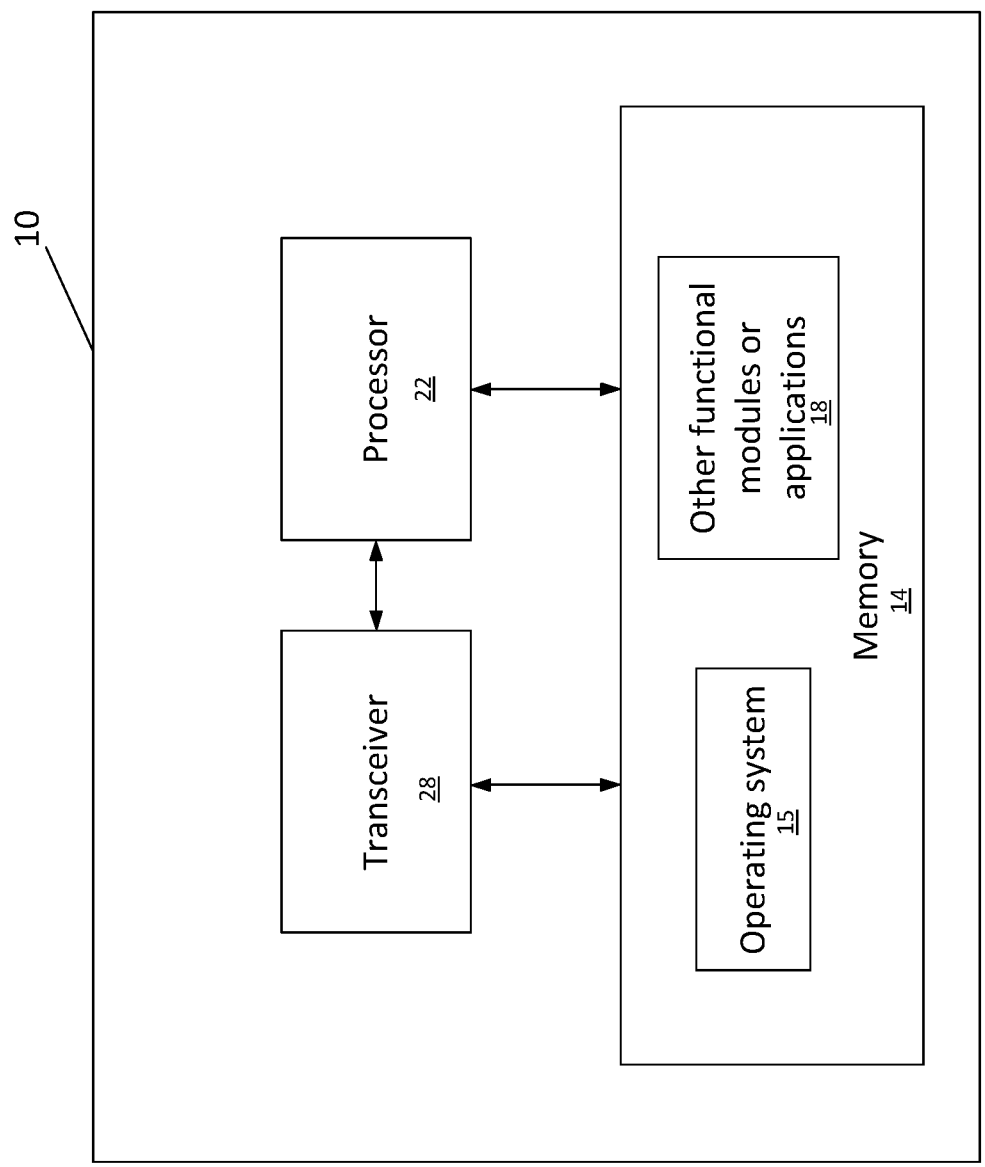
FIG. 4 illustrates an apparatus according to certain embodiments of the present invention.

FIG. 4 illustrates an apparatus 10 according to certain embodiments of the present invention. It should be understood that each signal or block in FIGS. 1-3 and the various functions described herein may be implemented by various means or their combinations, such as hardware, software, firmware, or one or more processors and/or circuitry. In an embodiment, apparatus 10 may be gasket module device, a portion of a gasket module device, or an electronic component that operates in conjunction with the gasket module device, for example. In other embodiments, apparatus 10 may be a logical drive or a microcontroller of the processor layer.

Apparatus 10 includes a processor 22 for processing information and executing instructions or operations. Processor 22 may be any type of general or specific purpose processor. While a single processor 22 is shown in FIG. 4, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein, including at least those illustrated in FIGS. 1-3.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, apparatus 10 may be configured to receive data from a first device, wherein the data is received via a first protocol. Apparatus 10 can also be configured to convert the data to be transmitted via a second protocol, wherein the second protocol is a high-speed proprietary or standard protocol. Apparatus 10 can also be configured to transmit the data via the second protocol to a second device.

Figure 5:
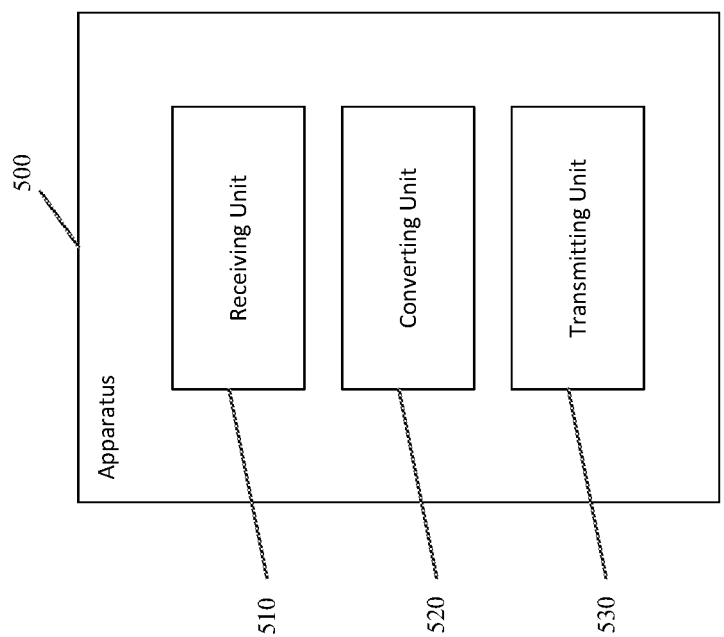
FIG. 5 illustrates another apparatus in accordance with certain embodiments of the invention.

FIG. 5 illustrates another apparatus in accordance with certain embodiments of the invention. Apparatus 500 can be a gasket module device, for example. Apparatus 500 can include a receiving unit 510 that receives data from a first device. The data is received via a first protocol. Apparatus 500 can also include a converting unit 520 that converts the data to be transmitted via a second protocol. The second protocol is a high-speed proprietary or standard protocol. Apparatus 500 can also include a transmitting unit 530 that transmits the data via the second protocol to a second device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving, by an electronic component, data from a first device, wherein the data is received via a plurality of protocols at the same time;
converting the data received via the plurality of protocols via a single protocol;
transmitting the converted data via the single protocol to a second device, wherein the single protocol is a high-speed proprietary or standard protocol;
performing data-rate multiplication by multiplying a data rate of the plurality of protocols and combining a plurality of lanes of the plurality of protocols on which the data is received; and
performing wavelength multiplication by receiving an input of one or more lanes of a native data rate, converting the one or more lanes into one or more different optical wavelengths, and simultaneously transmitting the one or more lanes on a single fiber.

2. The method of claim 1, wherein the electronic component comprises a gasket module.

3. The method of claim 1, wherein the first device comprises a logical drive that is at least one of a hard drive, a hard-drive platter, and a half-platter, and wherein the second device comprises a gasket module.

4. The method of claim 1, wherein the first device comprises a gasket module, and wherein the second device comprises a processor of a processor layer.

5. The method of claim 1, wherein the plurality of protocols comprises a Serial Attached SCSI (SAS) protocol or Peripheral Component Interconnect Express (PCIe) protocol, and wherein the single protocol comprises an optical communication protocol.

6. The method or claim 1, wherein the plurality of protocols comprises an electrical protocol, and wherein the single protocol comprises an optical communication protocol.

7. An apparatus, comprising:
at least one processor; and
at least one memory including computer program code,
wherein the at least one memory and the computer program code are configured to, with the at least one processor, cause the apparatus at least to:
receive data from a first device, wherein the data is received via a plurality of protocols at the same time;
convert the data received via the plurality of protocols via a single protocol;

transmit the converted data via the single protocol to a second device, wherein the single protocol is a high-speed proprietary or standard protocol;

perform data-rate multiplication by multiplying a data rate of the plurality of protocols and combining a plurality of lanes of the plurality of protocols on which the data is received; and perform wavelength multiplication by receiving an input of one or more lanes of a native data rate, converting the one or more lanes into one or more different optical wavelengths, and simultaneously transmitting the one or more lanes on a single fiber.

8. The apparatus of claim 7, wherein the apparatus further comprises a gasket module.

9. The apparatus of claim 7, wherein the first device comprises a logical drive that is at least one of a hard drive, a hard-drive platter, and a half-platter, and wherein the second device comprises a gasket module.

10. The apparatus of claim 7, wherein the first device comprises a gasket module, and wherein the second device comprises a processor of a processor layer.

11. The apparatus of claim 7, wherein the plurality of protocols comprises a Serial Attached SCSI (SAS) protocol or Peripheral Component Interconnect Express (PCIe) protocol, and wherein the single protocol comprises an optical communication protocol.

12. The apparatus of claim 7, wherein the plurality of protocols comprises an electrical protocol, and wherein the single protocol comprises an optical communication protocol.

13. A computer program, embodied on a non-transitory computer readable medium, the computer program, when executed by a processor, causes the processor to:

receive data from a first device, wherein the data is received via a plurality of protocols at the same time;

convert the data received via the plurality of protocols via a single protocol;

transmit the converted data via the single protocol to a second device, wherein the single protocol is a high-speed proprietary or standard protocol;

perform data-rate multiplication by multiplying a data rate of the plurality of protocols and combining a plurality of lanes of the plurality of protocols on which the data is received; and perform wavelength multiplication by receiving an input of one or more lanes of a native data rate, converting the one or more lanes into one or more different optical wavelengths, and simultaneously transmitting the one or more lanes on a single fiber.

14. The computer program of claim 13, wherein the apparatus further comprises a gasket module.

15. The computer program of claim 13, wherein the first device comprises a logical drive that is at least one of a hard drive, a hard-drive platter, and a half-platter, and wherein the second device comprises a gasket module.

16. The computer program of claim 13, wherein the first device comprises a gasket module, and wherein the second device comprises a processor of a processor layer.

17. The computer program of claim 13, wherein the plurality of protocols comprises a Serial Attached SCSI (SAS) protocol or Peripheral Component Interconnect Express (PCIe) protocol, and wherein the single protocol comprises an optical communication protocol.

18. The computer program of claim 13, wherein the plurality of protocols comprises an electrical protocol, and wherein the single protocol comprises an optical communication protocol.

\* \* \* \* \*